Figure 1:
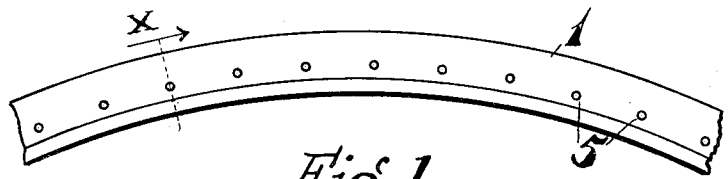

F. A. SEIBERLING.
TIRE.
APPLICATION FILED JAN. 25, 1908.

906,569.

Patented Dec. 15, 1908.

Witnesses:
A. E. Kling
Klenara Fox

INVENTOR—
Frank A. Seiberling,
BY C. E. Humphrey,
ATTORNEY

UNITED STATES PATENT OFFICE.

FRANK A. SEIBERLING, OF AKRON, OHIO.

TIRE.

No. 906,569.   Specification of Letters Patent.   Patented Dec. 15, 1908.

Application filed January 25, 1908. Serial No. 412,551.

*To all whom it may concern:*

Be it known that I, FRANK A. SEIBERLING, a citizen of the United States, residing at Akron, in the county of Summit and State of Ohio, have invented new and useful Improvements in Tires, of which the following is a specification.

This invention relates to elastic vehicle tires and the object thereof is to construct a solid vehicle tire in such a manner that the resiliency thereof will be increased and the amount of material employed in its construction reduced.

A further object of this invention is to provide a solid vehicle tire with a circumferential series of transversely-extending independent air cushions suitably spaced apart, said air cushions comprising transversely-formed openings extending from side to side of the tire provided with enlarged intermediate portions and contracted ends whereby when said walls around said openings are compressed the air contained therein will be slowly driven out.

Other advantages constituting objects of this invention will more fully appear in the subjoined description.

A practical embodiment of this invention is illustrated in the accompanying drawings in which similar reference numerals indicate like parts in the different figures.

Figure 2:

Referring to the drawings Figure 1 is a view in side elevation of a solid rubber tire made in accordance with this invention. Fig. 2 is a view similar to Fig. 1 of a tire having a notched tread, and, Fig. 3 is a sectional view on line X of Fig. 1.

Referring to the drawings in detail, 1 is a solid rubber tire of any cross sectional configuration which may be desired by the maker or user and illustrated by the well known Grant type comprising a flat base with upwardly and outwardly diverging sides from which extend upwardly and inwardly-converging portions formed upon curvilinear lines terminating in a rounded tread. Embedded in the base portion of the tire are circumferential retaining bands or wires 2 by which the tire is retained in position on the wheel rim, but any form of fastening device for retaining the tire may be employed. This tire may be provided as shown in Fig. 2 with a longitudinally-extending series of transverse notches 3, 3, to increase the grip or traction of the tire on the ground.

Figure 3:
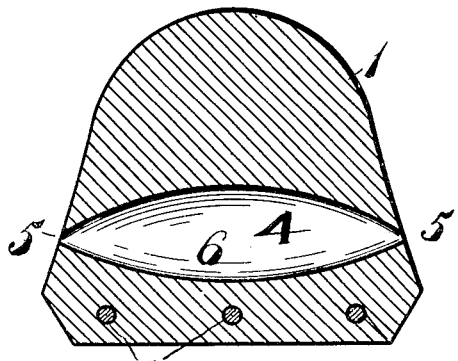

At preferably regularly-recurring intervals in the body of the tire are formed openings 4 preferably of substantially the shape shown in Fig. 3 wherein they are provided with contracted ends 5, 5, and an enlarged intermediate portion 6. These openings are formed in the tire during the making thereof and after vulcanization retain their shape. Being surrounded by a body of rubber of considerable thickness it requires a considerable degree of pressure to compress the sides or walls of the opening 4 together, this latter effect being increased by the fact that the contained air is expelled very slowly through the contracted ends 5, 5. When the tire is in use the same compressive force which tends to collapse the openings 4 also tends to contract or render smaller the openings 5, 5, thereby increasing the resistance to the escape of air from the openings 4 by narrowing its means of exit.

When employing this invention with respect to a tire such as is shown in Fig. 2 wherein the tread is provided with a longitudinal series of transversely-extending notches 3, 3, the openings 4 are generally placed so as to alternate in position with respect to the notches thereby reducing the amount of material contained in the body of the tire between the notches and increasing the resiliency of the tire by rendering its compression easier. After the pressure on the tread of the tire which collapses the openings 4 is removed, the resiliency of the material of which the tire is composed causes the parts to resume their normal position thereby slowly expanding the openings 4 to their initial shape by gradually drawing in air through the contracted openings 5, 5. From the foregoing it will be seen that by placing these openings in the body of the tire the resiliency of the same is greatly increased and the amount of material required to construct a tire reduced, thereby making a serviceable tire at a considerable decrease in the cost thereof and at the same time making a more commercially salable article.

What I claim, is:—

A tire for the wheels of road vehicles consisting of a rubber body having spaced air chambers formed therein, said air chambers extending from side to side of said tire body and each formed with a comparatively large medial portion from whence they gradually taper to minute openings at the lateral portions of said tire body.

In testimony whereof I have hereunto set my hand in presence of two subscribing witnesses.

FRANK A. SEIBERLING.

Witnesses:
R. A. CARRELL,
W. E. PALMER.